3,663,518
PROCESS FOR PREPARING ACRYLAMIDE POLYMERS
Harold I. Patzelt and Lawrence J. Connelly, Oak Lawn, Edward G. Ballweber, Chicago, David B. Korzenski, La Grange Park, and Kenneth L. Slepicka, Aurora, Ill., assignors to Nalco Chemical Company, Chicago, Ill.
No Drawing. Continuation of application Ser. No. 780,288, Nov. 29, 1968. This application July 8, 1970, Ser. No. 56,161
Int. Cl. C08f 1/08, 3/90, 15/00
U.S. Cl. 260—80.3 N
11 Claims

ABSTRACT OF THE DISCLOSURE

Monomers soluble in polar solvents, e.g., water and/or methanol, capable of undergoing polymerization exothermically are polymerized by: (1) forming a solution of at least one monomer and a catalyst, (2) forming the thus prepared solution into the form of a thin film, (3) heating the formed thin film to a temperature sufficient to initiate polymerization and initiating such polymerization, and (4) maintaining the polymerization temperature until the polymerization is essentially completed.

---

This application is a continuation of U.S. application Ser. No. 780,288, filed Nov. 29, 1968, now abandoned.

The invention is concerned with a new method of polymerizing monomers which polymerize exothermically in a solvent, especially monomers soluble in polar solvents, particularly acrylamide and copolymers of acrylamide with other vinyl monomers soluble in polar solvents.

One of the problems heretofore encountered in making polymers has been the difficulty of moving viscous masses. As the polymerization occurs, viscous masses are formed which cannot be handled readily. This causes a problem in drying and, as a result, it is only commercially feasible, in most instances, to keep the polymers in a liquid state. Furthermore, in most polymerization processes, the presence of air or atmospheric oxygen has heretofore been considered to be undesirable and to interfere with the polymerization. In order to overcome this, purging of the polymerization reaction mixture with nitrogen is employed. One of the objects of the present invention is to provide a new and improved type of polymerization process in which the resultant polymers are obtained directly as dried products.

Another object is to provide a new and improved polymerization process which can be carried out in the presence of air or atmospheric oxygen.

A more specific object of the invention is to provide a new and improved process for polymerizing monomers soluble in polar solvents, preferably acrylamide or mixtures of acrylamide with other vinyl monomers soluble in polar solvents.

Another specific object of the invention is to provide a new and improved process for producing polyacrylamide. Other objects will appear hereinafter.

In accordance with the invention, monomers soluble in polar solvents, e.g., water and/or methanol, capable of undergoing polymerization exothermically are polymerized by: (1) forming a solution of at least one monomer and a catalyst, (2) forming the thus prepared solution into the form of a thin film, (3) heating the formed thin film to a temperature sufficient to initiate polymerization and initiating such polymerization, and (4) maintaining the polymerization temperature until the desired polymerization is completed. The product can be recovered as a solid by adjusting the temperature of the polymerizate solution sufficiently to remove solvent from the system.

The thickness of the film or layer is a factor in the satisfactory operation of the process. Good results have been obtained when the film or layer thickness is within the range of 1 to 30 millimeters (mm.) and, in most cases, it is preferable to operate at a layer thickness of about 12.7 mm. (0.5 inch). Satisfactory results have also been obtained at a layer thickness of about 1.5 mm., 3.0 mm., and 6 mm. Thinner layers can be used.

The concentration of the monomer in the solution to be polymerized will depend upon the heat of reaction. In general, as the concentration of monomer in the polymerization reaction mixture is increased, a greater amount of heat will be generated. The concentration of monomer should therefore be controlled so that the heat of reaction will vaporize at least a part of the solvent but will not decompose the resultant polymer or produce side reactions. Thus, in polymerizing acrylamide, it is desirable to maintain a monomer concentration within the range of about 20% to 30% by weight of the polymerization reaction mixture. This concentration can be as low as 3% in some cases and as high as saturation at polymerization temperatures in other cases, but is usually 10% to 50%. The thickness of the layer can also be varied depending upon the concentration of monomer used.

In accordance with a preferred embodiment of the invention, the process is carried out in a closed system, wherein the atmosphere above the reaction film or layer is heated. For example, an apparatus such as a humidity cabinet can be used in which the system is initially heated by warm air. After the polymerization begins, the temperature of the reaction mixture is actually higher than that of the heated air and thus the heated air acts as a coolant. When the reaction is carried out in a closed stationary chamber or cabinet, it is convenient to form the film or layer of the reaction mixture in trays. However, instead of this type of arrangement, the film or layer of reaction mixture can be formed on a conveyor drier whereby a continuous belt carrying the film or layer is moved continuously through a drying chamber. In either case, the product is dried in place without removing it from the location where it was originally formed.

The invention is especially useful in making water soluble polymers from ethylenically unsaturated monomers soluble in polar solvents, for example, in making polyacrylamide by polymerizing acrylamide in an aqueous solution containing an azo-bis-isobutyronitrile catalyst dissolved with the aid of methanol, the concentration of acrylamide being within the range of 10% to 50% by weight of the polymerization reaction mixture, preferably 20% to 30% by weight of said mixture, and the concentration of said catalyst being within the range of 0.03% to 2% by weight of the acrylamide, preferably about 0.5% by weight of the dry monomer. The amount of methanol used to dissolve the catalyst can vary and is usually within the range of about 0.5% to 40% by weight of the monomer, preferably 5% of the monomer.

The catalyst is preferably prepared as a separate solution and then added to an aqueous solution of the monomer under temperature conditions such that the catalyst will remain in solution but at a temperature insufficiently high to initiate the polymerization reaction. With an azo catalyst of the type previously described, the catalyst begins to come out of solution at a temperature below 100° F. (37.8° C.) and it is preferable to maintain a temperature at least this high when the catalyst is mixed with the aqueous solution of monomer.

A preferred way of carrying out the process is to place the monomer solution mixed with the catalyst in metal trays coated with an inert coating, for example, polytetrafluoroethylene (Teflon). The trays are placed in a drier unit where the temperature can be increased in any suitable manner, said unit being provided with an exhaust fan and an exhaust damper that can be closed. At the outset, the exhaust fan is turned off and the exhaust damper is closed in order to saturate the air above the trays and to minimize solvent evaporation while the monomer-catalyst solution is being warmed to reaction temperature. The drier temperature is then increased until the solution reaches reaction temperature. When the reaction occurs, the monomer solution thickens and the temperature of the reaction mixture rises above the boiling temperature. After the reaction is complete, the exhauts damper is opened and the exhaust fan turned on. Thereafter the drier temperature is again increased, preferably to about 220° F. (about 105° C.). When the drying is complete, the product will usually contain around 10% to 15% moisture. The polymer sheets are dry enough when they exhibit clean, easy release from the Teflon coated surface of the trays. The dry sheets will be soft at drying temperature but will harden when cooled to room temperature. The product can be ground to a finer state of subdivision in any suitable manner.

The same general procedure can be employed in preparing many different types of polymers but is especially useful in preparing polymers and copolymers where one of the monomers is acrylamide. Further examples of such polymers are copolymers made from 30% acrylic acid monomer and 70% acrylamide monomer and copolymers made from 50% acrylic acid monomer and 50% acrylamide monomer.

The invention will be further illustrated but is not limited by the following examples in which the quantities are given by weight unless otherwise indicated.

EXAMPLE I

A 30% solution of acrylamide monomer was prepared by mixing the acrylamide monomer with deionized water and adjusting the pH to 5.0 with sodium hydroxide. A catalyst solution was separately prepared by dissolving 5% by weight of azo-bis-isobutyronitrile in methanol. The acrylamide solution was heated to a temperature of 115° F. (46° C.) and held at this temperature. The catalyst solution and the acrylamide solution were then mixed together in a storage tank in proportions to give an amount of azo-bis-isobutyronitrile equal to 0.5% by weight of the acrylamide (on a dry basis) in the acrylamide solution. A series of rectangular aluminum trays coated with Teflon were placed in a drier equipped with an exhaust fan and an exhaust damper. The drier was preheated to 120° F. with the fan turned off and the damper closed. The monomer-catalyst solution was then fed into the trays so as to fill each tray to the ½" level (1.27 cm.). When the trays were filled to the desired level, the drier temperature was increased to 170° F. This caused the monomer-catalyst solution in the trays to be heated to a temperature between 120°–135° F. in about 45 minutes and initiated the polymerization reaction. The reaction was essentially complete in about a half hour after initiation. During the reaction, the catalyst-monomer solution in each tray snapped and popped and there was considerable water vapor released due to the heat of reaction. The solution temperature rose to a peak of about 113°–119° C. When the reaction was complete, the exhaust damper was opened and the exhaust fan turned on. A half hour after reaction completion the drier temperature was increased to 220° F. (104° C.). Drying required about 15–17 hours. When drying was complete, the trays were removed from the drier and allowed to stand at room temperature. The resultant polymer sheets are dry enough when they exhibit clean, easy release from the coated surface of the trays. Moisture content when dry is about 10–15%. The dry sheets will be soft at drying temperature but will harden when cooled to room temperature.

EXAMPLE II

The procedure was the same as in Example I except that a 50% solution of acrylamide in deionized water was employed, the amount of catalyst, based on the acrylamide, was 0.25%, and the amount of methanol based on acrylamide, was 5%. The initiation temperature was 60° C. A 1% solution of the dried product in deionized water at room temperature (25° C.) gave a viscosity of 20.7 centipoises.

EXAMPLE III

The same procedure was used as in Example I except that the acrylamide solution contained 20% acrylamide and 80% deionized water. The temperature of polymerization initiation was 60°–61° C. and the polymerization time was 30 minutes. The viscosity of a 1% solution of the product in deionized water was 47 centipoises at 25° C.

EXAMPLE IV

The procedure was the same as in Example I except that the monomer solution was made by mixing 14 parts of acrylamide and 6 parts of acrylic acid with 80 parts of deionized water and the pH was adjusted to 8.4. The catalyst solution consisted of 1% of azobis-isobutyronitrile in 20% of methanol based on the total weight of monomer. The initiation temperature was 140°–150° F. (60°–66° C.), the reaction time was 1.75 hours, the drying temperature was 167° F. (75° C.) and the drying time was 22 hours.

EXAMPLE V

The procedure was the same as in Example IV except that the monomer solution consisted of 10 parts acrylamide, 10 parts acrylic acid, and 80 parts deionized water, and the pH was 8.6.

EXAMPLE VI

The procedure was the same as in Example V except that a mixture of $(NH_4)_2S_2O_8$ and $Na_2S_2O_5$ in proportions based on the total monomer of 0.025% and 0.10%, respectively, was used as a catalyst. The pH of the monomer solution was 8.5, the initiation temperature was 140° F. (60° C.), the reaction time was 0.75 hours, and the drying time was 16 hours.

EXAMPLE VII

The procedure was the same as in Example VI except that the catalyst consisted of 0.25% of $(NH_4)_2S_2O$ only.

EXAMPLE VIII

The procedure was the same as in Example VI except that the relative amounts of the catalyst ingredients were were 0.10% and 0.40%, respectively, based on the total monomer, and 0.1% based on the total monomer of the tetra-sodium salt of ethylene diaminetetraacetic acid was added as a chelating agent. The initiation temperature was 140° F. (60° C.), the reaction time was one hour, the drying temperature was 167° F. (75° C.) and the drying time was 15 hours.

It will be recognized that the foregoing examples are illustrative and are subject to some variation. Thus, various types of catalyst systems can be used, the process can be carried out at different pH's and various film thicknesses can be employed. The pressure on the reaction mixture layer during reaction or thereafter during drying can be atmospheric, subatmospheric, or superatmospheric. The process has also been carried out in a similar manner to that described in the examples using a nitrogen purge of the monomer solution. However, as previously indicated, one advantage of the process is that it can be carried out without a nitrogen purge under atmospheric air pressure.

The products of the examples are especially useful for coagulation and sedimentation of suspensions. The preferred products are soluble in water and small amounts of the order of 1-15 p.p.m. when added to aqueous suspensions of suspended solids, for example, turbid water containing silica, coal wash water, and water containing suspended iron oxide from steel mills, are effective to cause settling of the suspended solids which can then be separated from the aqueous layer either by decantation, by filtration or in some other manner.

We claim:

1. A method of preparing water soluble acrylamide polymers from a solution of a polar solvent and a polar solvent soluble ethylenically unsaturated monomer or mixture of monomers from the group consisting of acrylamide and mixtures of acrylamide and acrylic acid that polymerize exothermically to form viscous masses in polar solvents during polymerization which consists essentially of polymerizing such polar solvent soluble monomer or mixture of monomers capable of undergoing polymerization exothermically by means of the following steps:

(A) forming a polar solvent solution of said monomer or mixture of monomers in a concentration of 3% by weight to saturation and a catalytically effective amount of a polymerization catalyst while maintaining a temperature of at least 100° F. but below the polymerization temperature, (B) forming the thus prepared solution into the form of a layer 1 to 30 millimeters thick on a supporting surface, (C) heating the formed layer in a closed chamber with a gas heated to a temperature just sufficient to initiate polymerization but below the maximum polymerization temperature obtained by the exothermic reaction, thereby initiating such polymerization, and (D) thereafter continuing the polymerization in said closed chamber solely by the exothermic heat of reaction without adding further heat while utilizing said gas as a coolant until the desired polymerization is completed and while maintaining said layer in place on said supporting surface.

2. A process as claimed in claim 1 in which the product is recovered as a solid by raising the temperature of the polymerization solution after step D sufficiently to remove the solvent from the system.

3. A process as claimed in claim 1 in which said polar solvent consists essentially of water and methanol.

4. A process as claimed in claim 1 in which the process is carried out in a closed chamber in the presence of atmospheric air.

5. A process as claimed in claim 1 in which the concentration of the monomer in solution is within the range of 10% to 50% by weight.

6. A process as claimed in claim 1 in which the monomer is acrylamide.

7. A process as claimed in claim 1 in which acrylamide and acrylic acid are employed as monomers.

8. A process as claimed in claim 1 in which the monomer solution containing the catalyst is disposed in a tray coated on the inside with an inert coating.

9. A process as claimed in claim 8 in which said inert coating is polytetrafluoroethylene.

10. A process as claimed in claim 1 in which the monomer is acrylamide, the concentration of monomer in the solution is 20% to 30% by weight, the catalyst is azo-bis-isobutyronitrile, and the concentration of catalyst in the solution is 0.03% to 2% by weight of the acrylamide.

11. A process as claimed in claim 10 in which the catalyst solution contains a sufficient amount of methanol to dissolve the catalyst, said amount being within the range of 0.5% to 40% by weight of the acrylamide.

References Cited

UNITED STATES PATENTS

| | | | |
|---|---|---|---|
| 2,044,579 | 6/1936 | Kuettel | 260—2 |
| 3,058,958 | 10/1962 | Glavis | 260—80.3 |
| 3,215,680 | 11/1965 | Kolodny | 260—89.7 |
| 3,336,269 | 8/1967 | Monagle et al. | 260—79.3 |

FOREIGN PATENTS

| | | | |
|---|---|---|---|
| 646,714 | 11/1950 | England | 260—89.7 |
| 694,342 | 8/1967 | Belgium | 260—80 |

JOSEPH L. SCHOFER, Primary Examiner

S. M. LEVIN, Assistant Examiner

U.S. Cl. X.R.

260—89.7 R; 117—132 CF

PO-1050
(5/69)

UNITED STATES PATENT OFFICE
CERTIFICATE OF CORRECTION

Patent No. 3,663,518　　　　　　　　　Dated May 16, 1972

Inventor(s) Harold I. Patzelt et al

It is certified that error appears in the above-identified patent and that said Letters Patent are hereby corrected as shown below:

Column 4, line 47, "$(NH_4)_2S_2O$" should read -- $(NH_4)_2S_2O_8$ --.

Signed and sealed this 10th day of October 1972.

(SEAL)
Attest:

EDWARD M. FLETCHER, JR.　　　　　　ROBERT GOTTSCHALK
Attesting Officer　　　　　　　　　　Commissioner of Patents